United States Patent [19]

Lee et al.

[11] Patent Number: 5,417,054
[45] Date of Patent: May 23, 1995

[54] FUEL PURGING FUEL INJECTOR

[75] Inventors: Fei P. Lee, Novi; Theodore R. Koblish; Jerome R. Bradley, both of Holland, all of Mich.

[73] Assignee: Fuel Systems Textron, Inc., Zeeland, Mich.

[21] Appl. No.: 119,431

[22] Filed: Sep. 10, 1993

Related U.S. Application Data

[63] Continuation-in-part of Ser. No. 885,499, May 19, 1992, Pat. No. 5,277,023.

[51] Int. Cl.$^6$ .................................... F02G 3/00
[52] U.S. Cl. .................................. 60/39.094; 60/742; 239/406; 239/424
[58] Field of Search ................. 60/737, 741, 742, 748, 60/39.094; 239/404, 405, 406, 424

[56] References Cited

U.S. PATENT DOCUMENTS

| | | | |
|---|---|---|---|
| 2,480,019 | 8/1949 | Grimmeisen | 158/77 |
| 2,712,218 | 7/1955 | Ritter | 60/39.09 |
| 2,724,239 | 11/1955 | Fox | 60/741 |
| 2,806,354 | 9/1957 | Cook | 60/39.34 |
| 2,846,845 | 8/1958 | Parker | 60/39.09 |
| 2,949,736 | 8/1960 | Rubbra | 60/39.32 |
| 2,970,772 | 2/1961 | Boosinger et al. | 239/105 |
| 3,016,705 | 1/1962 | Kneidl et al. | 60/39.74 |
| 3,091,926 | 6/1963 | Watkins | 60/741 |
| 3,154,095 | 10/1964 | Cleminshaw et al. | 60/742 |
| 3,213,918 | 10/1965 | Rudzki et al. | 158/11 |
| 3,344,602 | 10/1967 | Davies et al. | 60/39.28 |
| 3,521,824 | 7/1970 | Wilcox | 239/424.5 |
| 3,541,788 | 11/1970 | Schutz | 60/39.09 |
| 3,684,186 | 8/1972 | Helmrich | 239/400 |
| 4,023,351 | 5/1977 | Beyler et al. | 60/742 |
| 4,028,888 | 6/1977 | Pilarczyk | 60/39.32 |
| 4,041,695 | 8/1977 | Harper et al. | 60/39.02 |
| 4,066,386 | 1/1978 | Johnson et al. | 417/199 |
| 4,170,108 | 10/1979 | Mobsby | 60/39.74 |
| 4,229,944 | 10/1980 | Weiler | 60/740 |
| 4,260,367 | 4/1981 | Markowski et al. | 60/748 |
| 4,262,698 | 4/1981 | Fields | 137/625.5 |
| 4,423,595 | 1/1984 | McLean | 60/261 |
| 4,464,901 | 8/1984 | Kobayashi et al. | 60/606 |
| 4,835,962 | 6/1989 | Rutter | 60/737 |
| 4,903,478 | 2/1990 | Seto et al. | 60/39.281 |
| 4,964,270 | 10/1990 | Taylor et al. | 60/39.094 |
| 4,984,424 | 1/1991 | Shekleton | 60/39.94 |
| 5,243,816 | 9/1993 | Huddas | 60/39.094 |

FOREIGN PATENT DOCUMENTS

| | | |
|---|---|---|
| 661580 | 7/1965 | Belgium . |
| 0132213 | 1/1985 | European Pat. Off. . |
| 3916477 | 11/1990 | Germany . |
| 2021254 | 11/1979 | United Kingdom . |
| WO90/05877 | 5/1990 | WIPO . |

OTHER PUBLICATIONS

Drawings A and B of gas turbine engines made by Pratt & Whitney Aircraft, United Technologies Corp.

*Primary Examiner*—Richard A. Bertsch
*Assistant Examiner*—M. Kocharov
*Attorney, Agent, or Firm*—Edward J. Timmer

[57] ABSTRACT

A self-purging fuel injector for a combustor of a gas turbine engine wherein the fuel injector comprises an injector body having first and second air discharge orifices for discharging air to the combustor and first and second fuel passage means having respective first and second fuel discharge orifices for discharging fuel to the combustor. The first and second fuel passages are in communication upstream of the fuel discharge orifices. The first air and fuel discharge orifices have a relationship to establish a pneumatic pressure at the first fuel discharge orifice and the second air and fuel discharge orifices have a relationship to establish a different pneumatic pressure at the second fuel discharge orifice such that, in the event the supply of fuel to the first and second fuel discharge orifices is interrupted, the fuel residing in the fuel passages between the first and second fuel discharge orifices is subjected to a pressure differential effective to purge the resident fuel into the combustor.

8 Claims, 3 Drawing Sheets

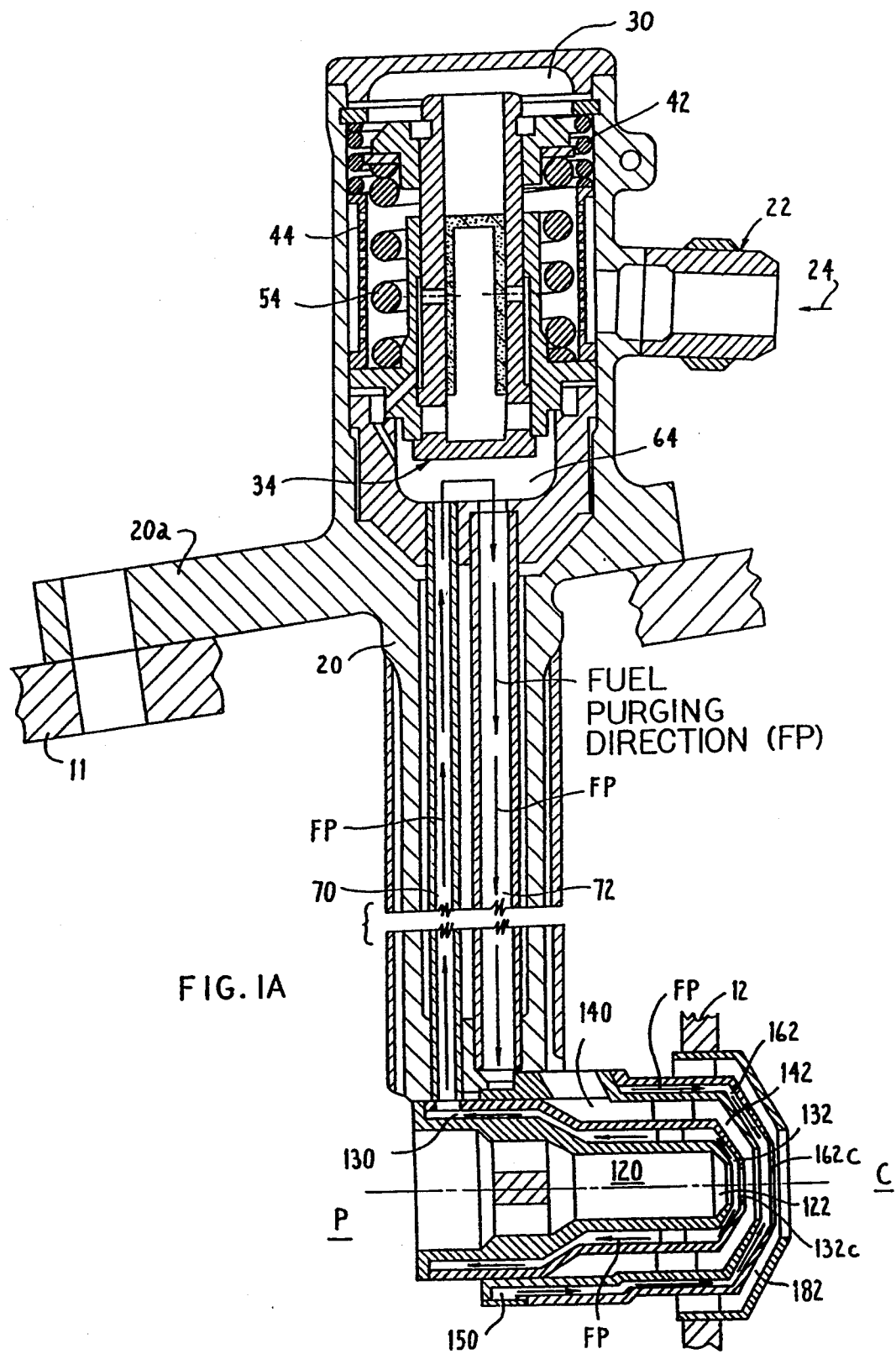
FIG. IA

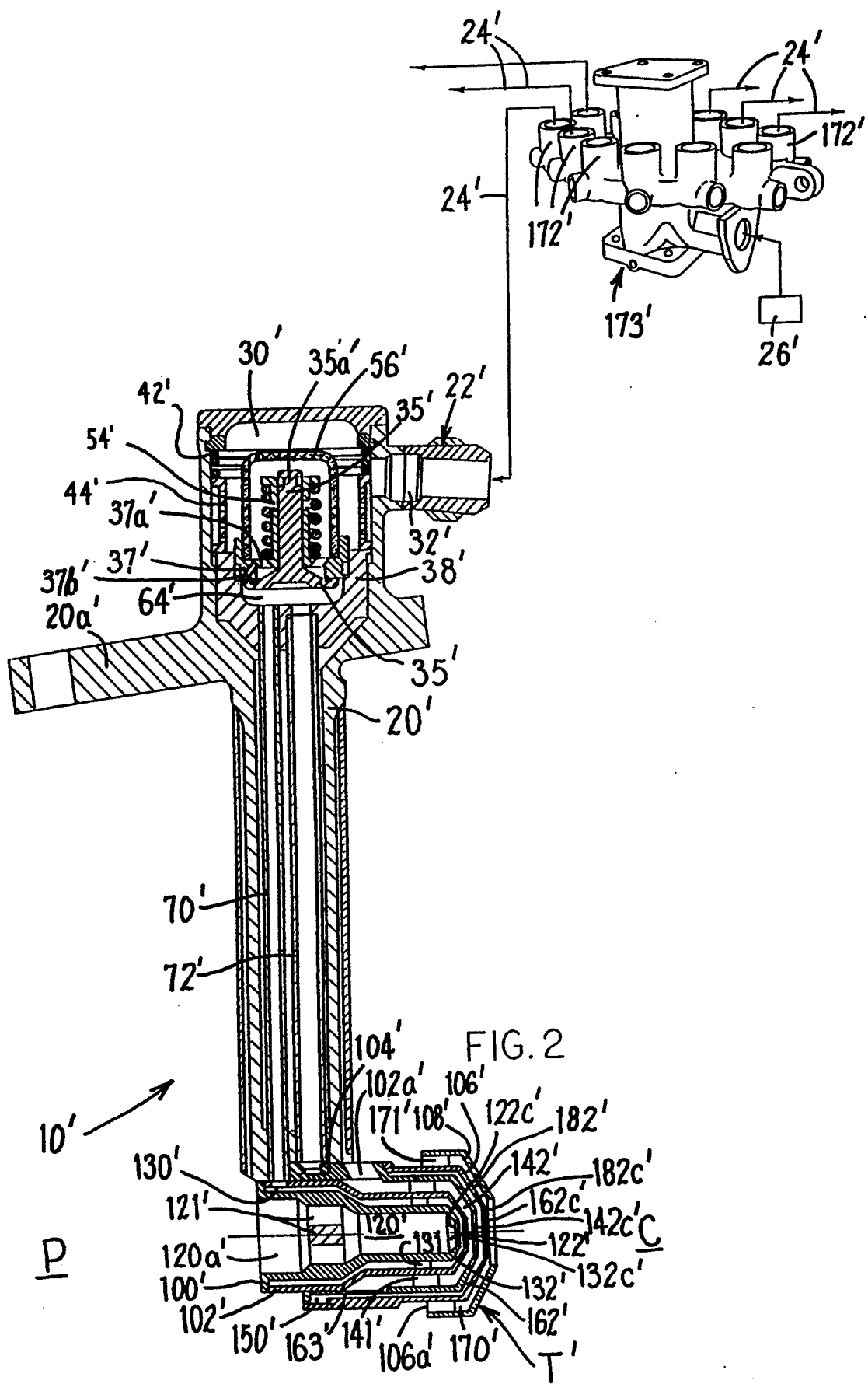

5,417,054

FUEL PURGING FUEL INJECTOR

This application is a continuation-in-part of U.S. Ser. No. 07/885 499, filed May 19, 1992, now U.S. Pat. No. 5,277,023.

FIELD OF THE INVENTION

The present invention relates to a self-purging fuel injector for a combustor of a gas turbine engine.

BACKGROUND OF THE INVENTION

Efforts to reduce emissions and improve combustor performance in gas turbine engines have brought about the use of staged fuel systems wherein one or more fuel injectors are used for low speed (low power) engine operation and one or more other fuel injectors are used for higher speed (higher power) engine operation. The fuel injectors used for low speed engine operation are commonly referred to as pilot or primary fuel injectors for providing a continuous fuel flow to the engine combustor for all regimes of engine operation from idle to high speed operation. The fuel injectors used for higher speed engine operation are referred to as secondary or main injectors for providing supplemental fuel flow to the engine combustor in an on-demand manner when higher engine speed (power) is required. The secondary fuel injectors thus are rendered non-operative during idle operation of the engine when the supplemental fuel flow is not needed and are rendered operative during higher speed (power) engine operation when supplemental fuel flow is required.

Airblast fuel injectors have been used in non-staged gas turbine engine fuel systems and are described in the Helmrich U.S. Pat. 3,864,186 issued Aug. 16, 1972 and the Simmons U.S. Pat. No. 3,980,233 issued Sept. 14, 1976. Airblast fuel injectors are designed to achieve atomization of a film of liquid fuel formed on a fuel discharge orifice surface or lip by directing high velocity airflow supplied to the injector from the engine compressor at the fuel film as it leaves the orifice surface.

Airblast fuel injectors have been proposed for use in a staged gas turbine engine fuel system. However, use of airblast fuel injectors in a staged fuel system may present a so-called coking problem when the airblast fuel injectors comprise the secondary (or main) injectors of the system that are rendered non-operative during some engine operational regimes (e.g., low power regime such as low speed idle operation) and operative during other engine operational regimes (e.g., high speed operation). In particular, when the secondary (or main) fuel injectors are rendered non-operative during low power engine operation, fuel remains in the fuel discharge passages of the injectors and can be heated by the elevated temperature of the combustor environment to the extent that the fuel in the fuel discharge passages is carbonized (coked) over time, building up carbonaceous deposits therein. These deposits can adversely affect the performance of the airblast fuel injector in service from the standpoint that injector fuel flow rate and fuel atomization become unsatisfactory. Similar deposits may build-up in the fuel passages of other air atomizing fuel injectors that employ high velocity compressor airflow to atomize fuel discharged form a fuel discharge passage/lip.

Copending application Ser. No. 07/901 424 filed Jun. 19, 1992, commonly assigned herewith discloses a self-purging airblast injector that includes a fuel purge passage communicated to an air discharge passage of the fuel injector via a valve that is operable upon interruption of fuel flow to the fuel injector to provide purge air from the air discharge passage through the purge passage and fuel discharge passage to purge fuel residing in the fuel passage to the combustor of the gas turbine engine.

It is an object of the present invention to provide a fuel injector for a combustor of a gas turbine engine wherein the fuel residing in the fuel passages of the fuel injector upon interruption in the supply of fuel thereto is purged to the combustor as a result of a pneumatic pressure differential established on the resident fuel.

It is another object of the present invention to provide a fuel injector for a combustor of a gas turbine engine wherein the fuel residing in the fuel passages of the fuel injector upon interruption in the supply of fuel thereto is purged to the combustor rapidly enough that the purged fuel is ignited by the existing flame region of the fuel injector in the combustor.

SUMMARY OF THE INVENTION

The present invention contemplates a self-purging fuel injector for a combustor of a gas turbine engine wherein the fuel injector comprises an injector body means having first and second air discharge orifices for discharging air to the combustor and first and second fuel passage means having respective first and second fuel discharge orifices for discharging fuel to the combustor. The first and second fuel passages are in communication upstream of the fuel discharge orifices. The first air and fuel discharge orifices have a relationship to establish a pneumatic pressure at the first fuel discharge orifice and the second air and fuel discharge orifices have a different relationship to establish a different pneumatic pressure at the second fuel discharge orifice such that, in the event the supply of fuel to the first and second fuel discharge orifices is interrupted, the fuel residing in the fuel passages between the first and second fuel discharge orifices is subjected to a pressure differential effective to purge the resident fuel into the combustor.

In one embodiment of the invention, the first air and fuel discharge orifices comprise an inner air discharge orifice and a fuel discharge orifice located about the inner air discharge orifice. The second air and fuel discharge orifices comprise an intermediate air discharge orifice located about the first fuel discharge orifice and an outer fuel discharge orifice located about the intermediate air discharge orifice.

In another embodiment of the invention, the first and second fuel passages are communicated downstream of a fuel control valve in the injector housing means. Preferably, the first and second fuel passages are communicated at a common chamber disposed downstream of a fuel control valve to receive fuel therefrom.

In a particular embodiment of the invention, a fuel injector of the invention comprises injector body means having an inner air passage with an inner air discharge orifice for discharging air to the combustor, a first fuel passage disposed about the inner air passage and having a first fuel discharge orifice for discharging fuel to the combustor, an intermediate air passage disposed about the first fuel passage and having an intermediate air discharge orifice, and a second fuel passage disposed about the intermediate air passage and having a second fuel discharge orifice for discharging fuel to the combustor. The first and second fuel passages are in communication upstream of the fuel discharge orifices. The inner air and first fuel discharge orifices have a relationship to establish a pneumatic pressure at the first fuel discharge orifice and the intermediate air and second fuel discharge orifices have a different relationship to establish a different pneumatic pressure at the second fuel discharge orifice such that, in the event the supply of fuel to the first and second fuel discharge orifices is interrupted, the fuel residing in the fuel passages between the first and second fuel discharge orifices is purged into the combustor by virtue of the pressure differential established.

Self-purging fuel injectors in accordance with the invention are advantageous in that each fuel injector is individually self-purging and thus can be identical to other fuel injectors providing fuel to the gas turbine engine combustor.

The aforementioned objects and advantages of the present invention will become more readily apparent from the detailed description and drawings which follow.

DESCRIPTION OF THE DRAWING

FIG. 1A is similar to FIG. 1 showing the direction of fuel purging in accordance with one embodiment of the invention.

FIG. 2 is a longitudinal sectional view of another embodiment of a self-purging airblast injector of the invention.

DETAILED DESCRIPTION OF THE INVENTION

Figure 1:
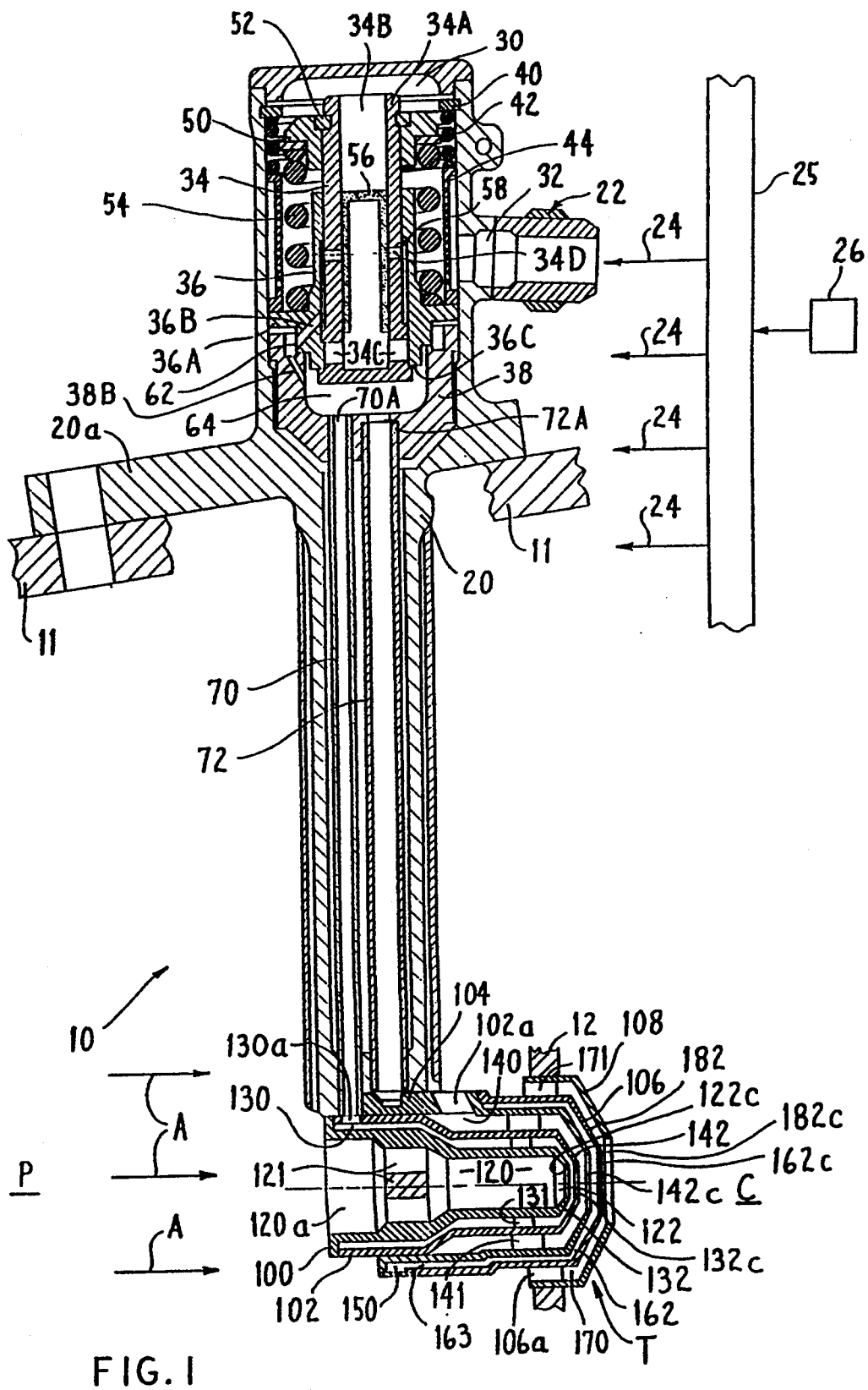
FIG. 1 is a longitudinal sectional view of one embodiment of a self-purging airblast injector of the invention.

Referring to FIG. 1, a self-purging airblast fuel injector 10 in accordance with one embodiment of the invention is shown. The fuel injector 10 includes a tubular support housing 20 having a flange 20a adapted to be fastened (e.g. bolted) to an engine housing 11 (shown schematically) in conventional manner and an injector tip T fastened to the support housing 20 and disposed in an opening in a gas turbine engine combustor wall 12 (partially shown) in conventional manner. The fuel injector 10 shown uses pressurized compressor discharge air (see arrows A) for fuel atomization as is known in the art; e.g., see U.S. Pat. No. 3,684,186.

The fuel injector 10 is shown including the tubular support housing 20 having a fuel inlet fitting 22 that is communicated via fuel conduit 24 (shown schematically) to a fuel manifold 25. The manifold 25 is supplied with pressurized fuel from a fuel pump 26 (shown schematically). A plurality of fuel injectors identical to injector 10 can be supplied with pressurized fuel from the manifold 25 via similar fuel conduits 24 illustrated in FIG. 1.

The inlet fitting 22 is communicated to a housing chamber 30 by passage 32. Disposed in the chamber 30 is fuel check/fuel metering valve 34 for controlling fuel flow. The metering valve 34 is disposed on a tubular valve support member 36. The valve support member 36 includes a circumferential flange 36A that is biased on a support cup 38 by a clip 40, spring 42, and a perforated screen or sleeve 44. In effect, the clip 40, spring 42, and sleeve 44 hold the valve support member 36 and the support cup 38 in position in the chamber 30.

The check/metering valve 34 includes a cap 50 held on the valve stem 34A by clip 52. A spring 54 is disposed between the cap 50 and the flange 36A of the valve support member 36 as shown to bias the valve 34 to a closed position until fuel pressure reaches a preselected valve opening pressure.

The valve 34 includes a central bore 34B that receives fuel from the upper region of the chamber 30. Disposed in the bore 34B is a fuel filter 56 through which the fuel flows prior to reaching the radially oriented, circumferentially spaced fuel passages 34C.

The passages 34D shown upstream of fuel passages 34C are communicated to an annular chamber 58 defined between the valve stem 34A and the valve support member 36 for providing a metered start fuel flow through passages 36B and 38B to fuel receiving chamber 64. This fuel may flow through one or both of tubes 70, 72 depending on fuel flowrate and the magnitude of the pneumatic pressure differential established between fuel discharge lips 132c, 162c discussed herebelow.

The check/fuel metering valve 34 is maintained in a closed position where the radially oriented valve fuel passages 34C are blocked by the lower end 36C of the valve support member 36 as shown in FIG. 1 until the fuel pressure reaches the preselected opening pressure. At that time, the valve 34 is moved downwardly against the bias of the spring 54 relative to the lower end 36C of the valve support member 36 to expose the passages 34C in a manner to provide a predetermined, controlled metered fuel flow schedule.

The metered fuel flow from valve 34 is received by the fuel receiving chamber 64 defined by the support cup 38. The fuel tubes or conduits 70, 72 conduct the fuel to the injector tip T for discharge to the combustor chamber C (shown schematically). The fuel tubes or conduits 70, 72 include respective upper ends 70A, 72A fastened by brazing in the support cup 38 as shown so that the open ends 70A, 72A communicate with the chamber 64 of the cup 64. The fuel tubes or conduits 70, 72 are thus communicated to one another via the fuel receiving chamber 64.

The injector tip T comprises a plurality of tubular injector bodies 100, 102, 104, 106, and 108 assembled together by brazing or similar metallurgical techniques. The tubular bodies 100 and 104 are fastened by brazing and the like directly to the support housing 20. The other tubular bodies 102, 106 and 108 are fastened by brazing to one of the bodies 100, 104 or to one another as illustrated in FIG. 1.

The inner tubular body 100 defines or forms therein a cylindrical, inner air supply chamber 120 having an enlarged, upstream open end 120a for receiving the compressor discharge air from a pressurized air plenum P communicated to the engine compressor (not shown). The chamber 120 receives the pressurized air via a plurality of circumferentially spaced air swirler vanes 121 disposed in the upstream region of the tubular body 100. The tubular body 100 includes a downstream, frusto-conical inner air discharge chamber 122 defining an air discharge orifice 122c for discharging the inner air to the combustor chamber C. The air discharge orifice 122c is defined by the annular lip shown.

The first intermediate tubular body 102 is disposed about and outboard of the inner tubular body 100 (i.e. radially outward). The intermediate tubular body 102 is fastened by brazing and the like to tubular bodies 100 and 104.

Between the inner and intermediate tubular bodies 100, 102 is defined a first, annular, inner fuel supply passage 130 having an upstream opening 130a communicated to the fuel tube or conduit 70. The passage 130 communicates with a frusto-conical fuel discharge passage 132. A plurality of circumferentially spaced apart fuel swirler vanes 131 are disposed between the fuel supply passages 130, 132 to impart swirl to the fuel. The inner fuel discharge passage 132 includes an annular, downstream fuel discharge orifice 132c for discharging fuel as a film or thin layer amenable for air atomization. The discharge orifice 132c is formed by the annular lip shown.

The second tubular body 104 is disposed about and outboard of the intermediate tubular body assembly 102 in a transverse (radial) direction and includes a plurality of circumferentially spaced apart air inlet openings 102a (one shown) that receive pressurized air from the plenum P. Between the intermediate tubular bodies 102, 104 is defined an annular intermediate air supply chamber 140 having a plurality of circumferentially spaced apart, radially extending air swirl vanes 141 therein. The air supply chamber 140 communicates with a frusto-conical air discharge chamber 142.

The intermediate air discharge chamber 142 includes an annular, downstream air discharge orifice 142c for discharging air flow for fuel atomization purposes. The air discharge orifice 142c is defined by the annular lip shown.

The third intermediate tubular body 106 is disposed about and outboard of the second intermediate tubular body 104 in a transverse (radial) direction. Defined between the tubular bodies 104, 106 is an annular fuel receiving passage 150 that communicates to the fuel tube or conduit 72 for receiving fuel therefrom. The fuel receiving passage 150 communicates with a frusto-conical fuel discharge passage 162 via an interconnecting fuel passage 163.

The intermediate fuel discharge passage 162 includes an annular, downstream fuel discharge orifice 162c for discharging fuel for fuel atomization purposes. The fuel discharge orifice 162c is defined by the annular lip shown.

The outer tubular body 108 is disposed about and outboard of the intermediate tubular body assembly 106 in a transverse (radial) direction and includes annular air inlet opening 106a that receives pressurized air from the plenum P. Between the tubular bodies 106, 108 is defined an annular outer air supply chamber 170 having a plurality of circumferentially spaced apart, radially extending air swirl vanes 171 therein. The air supply chamber 170 communicates with a frusto-conical air discharge chamber 182.

The outer air discharge chamber 182 includes an annular, downstream air discharge orifice 182c for discharging air flow for fuel atomization purposes. The air discharge orifice 182c is defined by the annular lip shown.

The air and fuel discharge orifices 122c, 132c, 142c, 162c, 182c are located axially and radially as shown in FIG. 1 so that the film thickness of discharging liquid fuel at fuel discharge orifices 132c, 162c can be controlled and atomized by the air discharged from the air discharge orifices 122c, 142c, 182c. Thus, each fuel flow stream discharged at orifices 32c, 162c is subjected to both inner and outer air atomizing flows.

During operation of the injector 10 when the valve 34 is opened, individual, atomized fuel flow streams are discharged from the injector tip T and atomized as substantially radially separate fuel streams that are subsequently merged or blended together in the combustor downstream of the discharge tip T as determined by the convergence and axial (longitudinal)/radial (transverse) orientation of the discharge chambers 122, 132, 142, 162, 182 as well as by air swirl angles of the inner, intermediate, and outer air flows (air from discharge orifices 122c, 142c, 182c as imparted by the associated injector air swirler vanes) and fuel swirl angles of the first and second fuel flows (discharged from fuel discharge orifices 132c, 162c ).

In accordance with the present invention, the first fuel passages 130, 132 and second fuel passages 150, 162 are in communication upstream of their respective fuel discharge orifices 132c, 162c by virtue of the fuel tubes or conduits 70, 72 communicating to the common fuel receiving chamber 64 defined in the support cup 38. Also, the first air and fuel discharge orifices 122c, 132c have a relationship to establish a pneumatic pressure at the first fuel discharge orifice 132c and the second air and fuel discharge orifices 142c, 162c have a different relationship to establish a different pneumatic pressure at the second fuel discharge orifice 162c such that, in the event the supply of fuel to the first and second fuel discharge orifices is interrupted, for example, for engine shut-down by closure of the valve 34 resulting from deactuation of fuel pump 26, the fuel residing in the chamber 64 and fuel passages 130, 132; 150, 162 between the first and second fuel discharge orifices 132c, 162c, as well as any transient fuel in chamber 64 from passages 36B, 38A, is subjected to a sufficient pressure differential effective to purge the fuel into the combustor C through the orifice 162c having the lesser pneumatic pressure thereat than established at orifice 132c. For example, upon interruption in fuel flow via closure of valve 34, a higher (e.g. relatively positive) pneumatic pressure is established at the fuel orifice 132c and a lower (e.g. relatively negative) pneumatic pressure is established at the fuel orifice 162c such that the fuel in the chamber 64 and fuel passages 130, 132; 150, 162 will be purged in a direction from the orifice 132c toward the orifice 162c for discharge from the orifice 162c into the combustor chamber C (see arrows FP in FIG. 1A that illustrate the direction of fuel purging). In effect, the fuel orifice 132c is rendered a "fuel pusher" orifice and the fuel orifice 162c is rendered a "fuel puller" orifice.

For purposes of illustration and not limitation, in practicing the invention, the relationship of the first air and fuel discharge orifices 122c, 132c can be different from the relationship of the second air and fuel discharge orifices 142c, 162c so as to establish the different pneumatic pressures at the first and second fuel discharge orifices 132c, 162c, whereby, in the event the supply of fuel to the first and second fuel discharge orifices is interrupted by closure of the valve 34, the fuel in the chamber 64 and fuel passages 130, 132; 150, 162 between the first and second fuel discharge orifices 132c, 162c is subjected to a sufficient differential pressure effective to purge the fuel into the combustor C through the lesser pressure orifice 162c. For example, the diameter of fuel discharge orifice 132c is less than the diameter of air discharge orifice 122c while the diameter of fuel discharge orifice 162c is greater than the diameter of air discharge orifice 142c. In particular, the radius of the fuel discharge orifice 132c is selected in the range, for example, 0.005 to 0.020 inch, less than that of orifice 122c, while the radius of fuel discharge orifice 162c is selected in the range, for example, 0.005 to 0.015 inch, greater than that of orifice 142c, the radial dimensions being selected to provide desired self purging of the resident fuel through the lesser pressure orifice 162c. That is, the diameters of orifices 122c, 132c and 142c, 162c are selected to establish a lower pneumatic pressure at orifice 162c than established at orifice 132c.

The invention is not so limited and can be practiced using other different relationships between the first air and fuel discharge orifices 122c, 132c and between the second air and fuel discharge orifices 142c, 162c as set forth, for example, in copending application Ser. No. 07/885,499, allowed, now U.S. Pat. No. 5,277,023, the teachings of which are incorporated herein by reference, to establish the different pneumatic pressures at the first and second fuel discharge orifices 132c, 162c in the event the supply of fuel to the first and second fuel discharge orifices is interrupted. The differential pressure needed for fuel purging can be established by using fuel pusher/fuel puller orifices 132c, 162c, fuel pusher/less fuel pusher orifices 132c, 162c, or fuel puller/less fuel puller orifices 132c, 162c as mentioned in the aforementioned copending allowed application.

FIG. 2 illustrates an alternative embodiment of the invention wherein like features are represented by like reference numerals primed. This embodiment differs from the embodiment of FIG. 1 in that the fuel injector is supplied with pressurized fuel from a fuel distribution valve 173' having a plurality of ports 172' each connected to an individual fuel injector (one shown) by a fuel conduit 24' (shown schematically). The distribution valve 173' is of known type used on the V2500 gas turbine engine made by Pratt & Whitney Aircraft, and described in U.S. Pat. Nos. 4,614,202 and 4,590,768, the teachings of which are incorporated herein. The distribution valve 173' provides metered fuel flow to each fuel injector. The distribution valve 173' receives fuel from fuel pump 26'.

Since the fuel received by each fuel injector is metered by the valve 173', only a check valve 35' is provided in the fuel receiving chamber 30' of the fuel injector housing 20'. The check valve 35' is supported on the support cup 38' which is held in the chamber 30' by a perforated hold down sleeve 44' and spring 42'. The valve 35' includes a valve stem 35a' biased by spring 54' to close against valve seat 37' until fuel pressure reaches a high enough level to overcome the spring and open the valve 35'. Upon opening of the valve 35', the fuel flows from the chamber 30' through filter 56' and valve seat openings 37a' into the fuel receiving chamber 64' and then into fuel tubes or conduits 70', 72' to the injector tip T', which is identical in construction to injector tip T described hereabove with respect to FIG. 1.

The fuel injector functions in the manner described above with respect to FIG. 1 to purge fuel from the chamber 64' and fuel passages 130', 132'; 150', 162' between the first and second fuel discharge orifices 132c', 162c' into the combustor C through one of the orifices 132c' or 162c' having lesser pneumatic pressure established thereat.

For example, the relationship of the first air and fuel discharge orifices 122c', 132c' can be different from the relationship of the second air and fuel discharge orifices 142c', 162c' (e.g. by the selection of diameters of orifices 122c', 132c' and orifices 142c', 162c' as described above) so as to establish the different pneumatic pressures at the first and second fuel discharge orifices 132c', 162c' such that, in the event the supply of fuel to the first and second fuel discharge orifices is interrupted by closure of the valve 35', the fuel residing in the chamber 64 and fuel passages 130', 132'; 150', 162' between the first and second fuel discharge orifices 132c', 162c' is subjected to a sufficient pressure differential effective to purge the resident fuel into the combustor C in a direction from fuel orifice 132c' to fuel orifice 162c' having lesser pneumatic pressure thereat.

While the invention has been described in terms of specific embodiments thereof, it is not intended to be limited thereto but rather only to the extent set forth hereafter in the following claims.

The embodiments of the invention in which an exclusive property or privilege is claimed are defined as follows:

1. A fuel injector for a combustor of a gas turbine engine, comprising an injector body means having first and second air discharge orifices for discharging air to the combustor and first and second fuel passage means having respective first and second fuel discharge orifices for discharging fuel to the combustor, said first and second fuel passage means being in communication upstream of said fuel discharge orifices, said first air and fuel discharge orifices having a relationship to establish a pneumatic pressure at said first fuel discharge orifice and said second air and fuel discharge orifices having a relationship to establish a different pneumatic pressure at said second fuel discharge orifice such that, in the event the supply of fuel to the first and second fuel discharge orifices is interrupted, the fuel residing in the first and second fuel passage means between said first and second fuel discharge orifices is subjected to a pressure differential effective to purge the resident fuel into the combustor.

2. The fuel injector of claim 1 wherein said first air and fuel discharge orifice means comprise an inner air discharge orifice and a fuel discharge orifice located radially outward of said inner air discharge orifice.

3. The fuel injector of claim 2 wherein said second air and fuel discharge orifice means comprise an intermediate air discharge orifice located radially outward of said first fuel discharge orifice and an outer fuel discharge orifice located radially outward of said intermediate air discharge orifice.

4. A fuel injector for a combustor of a gas turbine engine, comprising an injector body means having an inner air passage with an inner air discharge orifice for discharging air to the combustor, a first fuel passage disposed about the inner air passage and having a first fuel discharge orifice for discharging fuel to the combustor, an intermediate air passage disposed about the first fuel passage and having an intermediate air discharge orifice, and a second fuel passage disposed about the intermediate air passage and having a second fuel discharge orifice for discharging fuel to the combustor, said first and second fuel passages being in communication upstream of said fuel discharge orifices, said inner air and fuel discharge orifices having a relationship to establish a pneumatic pressure at said first fuel discharge orifice and said intermediate air and fuel discharge orifices having a relationship to establish a different pneumatic pressure at said second fuel discharge orifice such that, in the event the supply of fuel to the first and second fuel discharge orifices is interrupted, the fuel residing in the fuel passages between said first and second fuel discharge orifices is subjected to a pressure differential effective to purge the resident fuel into the combustor.

5. A fuel injector for a combustor of a gas turbine engine, comprising an injector body means having a fuel control valve disposed therein and having first and second air discharge orifices for discharging air to the combustor and first and second fuel passage means including respective first and second fuel discharge orifices for discharging fuel to the combustor, said first and second fuel passage means being in communication at a location downstream of the fuel control valve and upstream of said fuel discharge orifices, said first air and fuel discharge orifices having a relationship to establish a pneumatic pressure at said first fuel discharge orifice and said second air and fuel discharge orifices having a relationship to establish a different pneumatic pressure at said second fuel discharge orifice such that, in the event the supply of fuel to the first and second fuel discharge orifices is interrupted, the fuel residing in the first and second fuel passage means between said first and second fuel discharge orifices is subjected to a pressure differential effective to purge the resident fuel into the combustor.

6. The fuel injector of claim 5 wherein said first and second fuel passages are communicated at a common chamber disposed downstream of the fuel control valve to receive fuel therefrom.

7. A fuel injector for a combustor of a gas turbine engine, comprising an injector body means having a fuel control valve disposed therein and having an inner air passage with an inner air discharge orifice for discharging air to the combustor, a first fuel passage disposed about the inner air passage and having a first fuel discharge orifice for discharging fuel to the combustor, an intermediate air passage disposed about the first fuel passage and having an intermediate air discharge orifice, and a second fuel passage disposed about the intermediate air passage and having a second fuel discharge orifice for discharging fuel to the combustor, said first and second fuel passages being in communication at a location downstream of the fuel control valve and upstream of said fuel discharge orifices, said inner air and fuel discharge orifices having a relationship to establish a pneumatic pressure at said first fuel discharge orifice and said intermediate air and fuel discharge orifices having a relationship to establish a different pneumatic pressure at said second fuel discharge orifice such that, in the event the supply of fuel to the first and second fuel discharge orifices is interrupted, the fuel residing in the fuel passages between said first and second fuel discharge orifices is subjected to a pressure differential effective to purge the resident fuel into the combustor.

8. The fuel injector of claim 7 wherein said first and second fuel passages are communicated at a common chamber disposed downstream of the fuel control valve to receive fuel therefrom.

* * * * *